US011521001B2

(12) United States Patent
Sakurai et al.

(10) Patent No.: US 11,521,001 B2
(45) Date of Patent: Dec. 6, 2022

(54) RADIO TAG READING DEVICE

(71) Applicant: TOSHIBA TEC KABUSHIKI KAISHA, Tokyo (JP)

(72) Inventors: Wataru Sakurai, Shizuoka (JP); Nobuo Murofushi, Shizuoka (JP); Yuichiro Kawabe, Shizuoka (JP); Yuki Suzuki, Shizuoka (JP); Shigeaki Suzuki, Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 105 days.

(21) Appl. No.: 17/082,049

(22) Filed: Oct. 28, 2020

(65) Prior Publication Data

US 2021/0279435 A1 Sep. 9, 2021

(30) Foreign Application Priority Data

Mar. 9, 2020 (JP) .............................. JP2020-040257

(51) Int. Cl.
*G06K 7/08* (2006.01)
*G06K 7/10* (2006.01)

(52) U.S. Cl.
CPC ................................ *G06K 7/10386* (2013.01)

(58) Field of Classification Search
CPC .............................. G06K 7/10; G06K 7/10386
See application file for complete search history.

(56) References Cited

U.S. PATENT DOCUMENTS

| | | | | |
|---|---|---|---|---|
| 2004/0204240 | A1* | 10/2004 | Barney | A63J 21/00 463/36 |
| 2005/0143173 | A1* | 6/2005 | Barney | A63F 13/285 463/37 |
| 2016/0114326 | A1* | 4/2016 | Schryver | B01L 7/50 62/465 |
| 2016/0136496 | A1* | 5/2016 | Garnier | A63B 69/0048 315/76 |
| 2017/0108895 | A1* | 4/2017 | Chamberlin | H02J 7/0044 |
| 2018/0068145 | A1* | 3/2018 | Todeschini | H04M 1/72412 |
| 2018/0132850 | A1 | 5/2018 | Leimbach et al. | |
| 2019/0224865 | A1 | 7/2019 | Robinson et al. | |
| 2020/0270853 | A1* | 8/2020 | Le | G01P 13/0006 |
| 2020/0345353 | A1* | 11/2020 | Leimbach | A61B 18/1445 |
| 2020/0345359 | A1* | 11/2020 | Baxter, III | A61B 17/07207 |
| 2022/0004722 | A1* | 1/2022 | Teshirogi | G06K 7/10722 |

FOREIGN PATENT DOCUMENTS

JP 11-203429 7/1999

OTHER PUBLICATIONS

Extended European Search Report for European Patent Application No. 20211851.9 dated May 14, 2021.

* cited by examiner

*Primary Examiner* — Thien M Le (74) *Attorney, Agent, or Firm* — Amin, Turocy & Watson, LLP (57) ABSTRACT

According to one embodiment, a radio tag reading device includes: a body portion including a radio tag reading unit that reads a radio tag; a grip portion detachably connected to the body portion; a magnet provided in the grip portion; a magnet detection unit provided in the body portion and configured to detect magnetism generated by the magnet; a state detection unit configured to detect a state of the grip portion based on the magnetism detected by the magnet detection unit; and a reading control unit configured to control the radio tag reading unit.

20 Claims, 9 Drawing Sheets

| STATE OF MAGNETIC FLUX DENSITY | STATE OF GRIP PORTION |
|---|---|
| MAGNETIC FLUX DENSITY > 10mT | TRIGGER ON (CONNECTION) |
| 4mT ≤ MAGNETIC FLUX DENSITY ≤ 10mT | TRIGGER OFF (CONNECTION) |
| 4mT > MAGNETIC FLUX DENSITY | NO CONNECTION |

RADIO TAG READING DEVICE

CROSS-REFERENCE TO RELATED APPLICATION

This application is based upon and claims the benefit of priority from Japanese Patent Application No. 2020-040257, filed on Mar. 9, 2020, the entire contents of which are incorporated herein by reference.

FIELD

Embodiments described herein relate generally to a radio tag reading device.

BACKGROUND

In the related art, handy radio tag reading devices that perform inventory management or incoming and outcoming management of commodities to which radio tags are attached by reading data stored by the radio tags have been known. There are demands for using such handy radio tag reading devices as stationary radio tag reading devices for payment processes, inspection processes, and the like.

However, since handy radio tag reading devices of the related art have integrated body portions and grip portions, it is difficult to install the handy radio tag reading devices in a stable state due to interruption of the grip portions in some cases. When the handy radio tag reading devices are used with hands and are inserted in narrow places, the grip portions are interrupted in reading of radio tags, and thus there is concern of the handy radio tag reading devices being difficult to insert.

DETAILED DESCRIPTION

In general, an exemplary embodiment provides a radio tag reading device in which a grip portion can be detachably mounted on a body portion.

According to one embodiment, a radio tag reading device includes: a body portion including a radio tag reading unit that reads a radio tag; a grip portion detachably connected to the body portion; a magnet provided in the grip portion; and a magnet detection unit provided in the body portion and configured to detect magnetism generated by the magnet.

Configuration of Radio Tag Reading Device

Hereinafter, an embodiment of the radio tag reading device will be described with reference to the drawings. An exemplary embodiment is not limited to the following embodiment.

Figure 1:
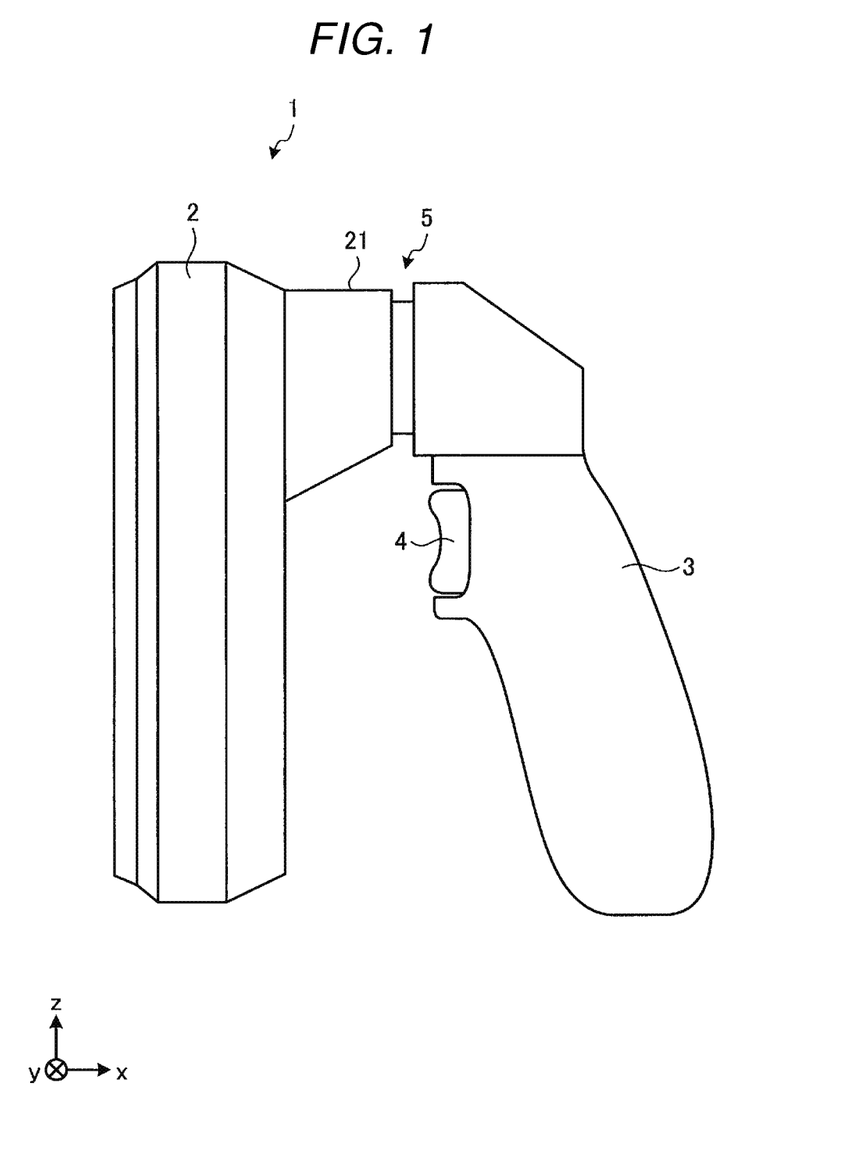
FIG. 1 is a perspective view illustrating an example of the outer appearance of a radio tag reading device according to an embodiment.

First, a radio tag reading device 1 according to the embodiment will be described. FIG. 1 is a perspective view illustrating an example of the outer appearance of a radio tag reading device according to the embodiment. The radio tag reading device 1 includes a body portion 2, a grip portion 3, a trigger switch 4, and a joining portion 5.

The body portion 2 includes an antenna, an RFID reader/writer, a control unit, and battery. The body portion 2 performs wireless communication with a radio frequency identification (RFID) tag attached to a commodity. The body portion 2 transmits and receives a radio wave to perform the wireless communication with the RFID tag. The body portion 2 includes a protrusion 21. The RFID reader/writer is an example of a "radio tag reading unit" and the RFID tag is an example of a "radio tag".

The grip portion 3 is a portion which a user grips in an operation. The grip portion 3 is formed on the rear side of the body portion 2. The grip portion 3 is detachably connected to the body portion 2. The trigger switch 4 is provided in the grip portion 3. The trigger switch 4 is a switch used to perform an operation of reading an RFID tag. The trigger switch 4 is an example of an "operation unit".

According to the embodiment, the trigger switch 4 changes a state of the grip portion 3 to a state in which a distance between a magnet 7 to be described below and a magnetic sensor 6 to be described below is close or a state in which the distance between the magnet 7 and the magnetic sensor 6 is distant through a user operation when the body portion 2 is connected to the grip portion 3.

When user operates the trigger switch 4 gripping the grip portion 3 so that the state of the grip portion 3 is the state in which the distance between the magnet 7 and the magnetic sensor 6 is close, the radio tag reading device 1 radiates a radio wave toward the front side (the negative x-axis direction) from the antenna in the body portion 2.

When the user operates the trigger switch 4 so that the state of the grip portion 3 is the state in which the distance between the magnet 7 and the magnetic sensor 6 is distant, the radio tag reading device 1 stops the radiation of the radio wave from the antenna of the body portion 2. An internal structure of the grip portion 3 including the trigger switch 4 will be described later.

In the embodiment, when the grip portion 3 of the radio tag reading device 1 is detached, the body portion 2 enters a state in which a radio wave is regularly radiated. When the body portion 2 includes a power switch (not illustrated) and the grip portion 3 is detached, the radiation of the radio wave can be stopped by turning off a power source of the body portion 2. A switch that has a similar function to the function of the trigger switch 4 that controls radiation of a radio wave and stopping of the radiation may also be provided on the side of the body portion 2.

The joining portion 5 is a portion that joins the body portion 2 with the grip portion 3 when the body portion 2 is connected to the grip portion 3. A detailed structure of the vicinity of the joining portion 5 will be described later.

The radio tag reading device 1 may include a display unit that displays information and an operation unit that receives an input of information by a user. The display unit and the operation unit may be substituted with, for example, a display screen or a touch panel of a portable terminal such as a smartphone, a tablet PC, a cellular phone, or a personal digital assistant (PDA).

Figure 2:
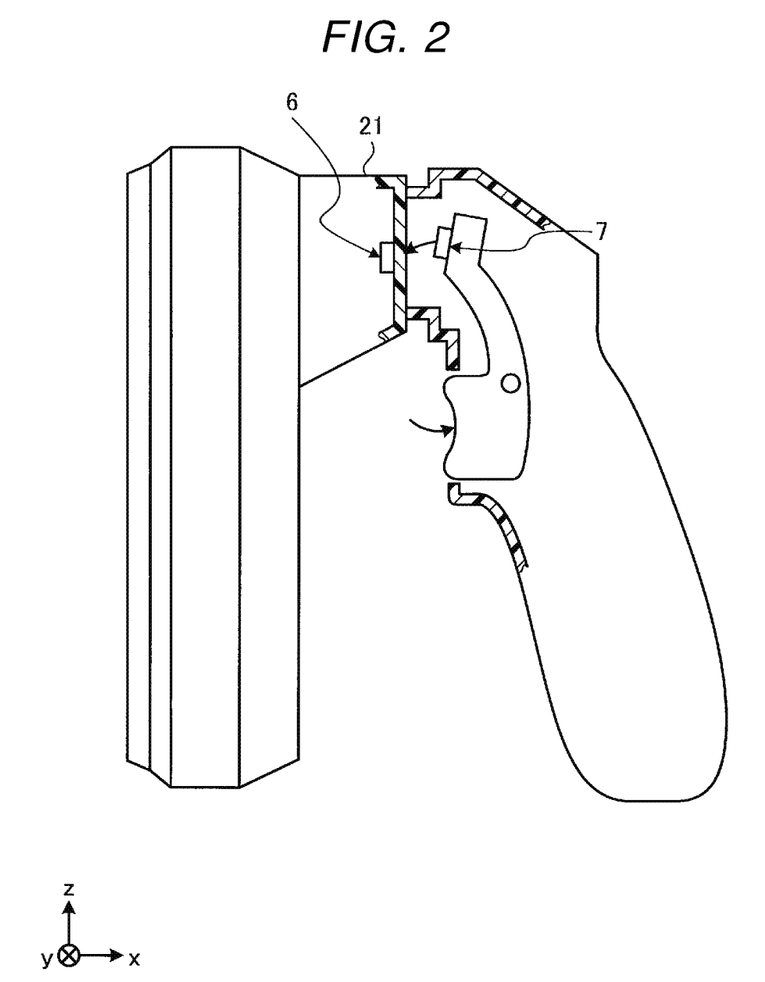
FIG. 2 is a diagram illustrating an example of an internal structure of the radio tag reading device.

Next, an internal structure of the grip portion 3 will be described. FIG. 2 is a diagram illustrating an example of an internal structure of the vicinity of the joining portion of the radio tag reading device. The radio tag reading device 1 includes the magnetic sensor 6 inside the body portion 2 and includes the magnet 7 inside the grip portion 3.

The magnetic sensor 6 is provided inside the protrusion 21 of the body portion 2. The magnetic sensor 6 detects magnetism generated by the magnet 7. In the embodiment, the magnetic sensor 6 detects magnetism as a magnetic flux density. The magnetic sensor 6 is an example of a "magnetic detection unit".

The magnet 7 moves in conjunction with an operation on the trigger switch 4 and a distance between the magnet 7 and the magnetic sensor 6 changes according to an operation of the trigger switch 4. According to the embodiment, the trigger switch 4 has a structure in which the trigger switch 4 is pushed to the inside of the grip portion 3 when the user presses the trigger switch 4 with their index finger or the like and the trigger switch 4 is returned to an original state (a state in which the trigger switch 4 is not pushed to the inside of the grip portion 3) when the user detaches their index finger.

In the embodiment, the magnet 7 is attached to the trigger switch 4 and is mounted on the trigger switch 4 to be close to or be away from the magnetic sensor 6 in conjunction with a motion of the user pressing the trigger switch 4 with their finger or detaching their finger from the trigger switch 4 so that the pressed state returns to the original state. The magnet 7 is an example of a "magnet".

For example, when the body portion 2 is connected to the grip portion 3 and the user presses the trigger switch 4, the magnet 7 comes close to the magnetic sensor 6. That is, the magnetic flux density detected by the magnetic sensor 6 is higher than before the user presses the trigger switch 4.

Conversely, when the user detaches their finger from the trigger switch 4 and the pressed state returns to the original state, the magnet 7 goes away from the magnetic sensor 6. That is, the magnetic flux density detected by the magnetic sensor 6 is lower than when the user returns the trigger switch 4 to the original state.

Accordingly, the radio tag reading device 1 according to the embodiment can detect whether the state of the grip portion 3 is a state in which the distance between the magnetic sensor 6 and the magnet 7 at the time of pressing of the trigger switch 4 is close or a state in which the distance between the magnetic sensor 6 and the magnet 7 at the time of not pressing of the trigger switch 4 is distant, from a change in the magnetic flux density detected by the magnetic sensor 6.

Figure 3:
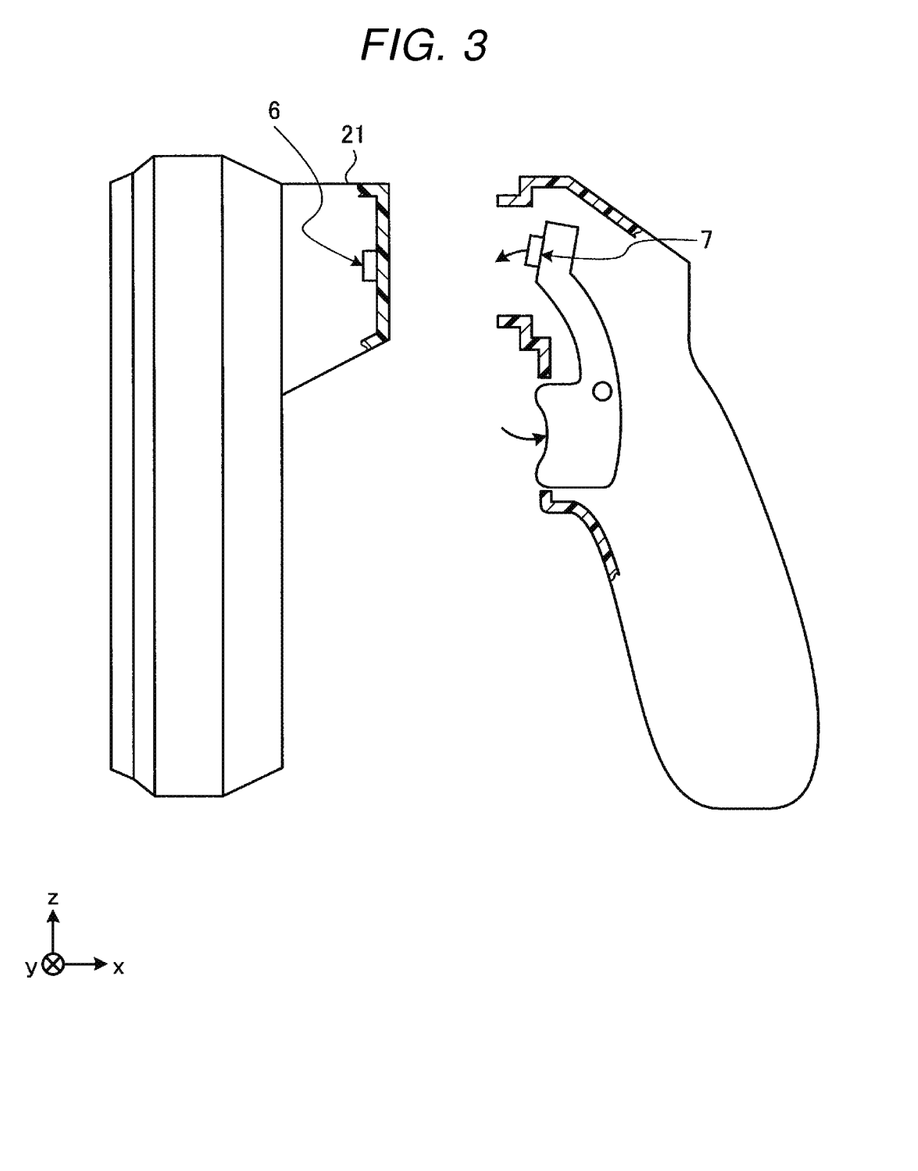
FIG. 3 is a diagram illustrating an example of a state in which a grip portion is detached from a body portion of the radio tag reading device.

The radio tag reading device 1 according to the embodiment can also detect whether the state of the grip portion 3 is a connection state in which the grip portion 3 is connected to the body portion 2 or a non-connection state in which the grip portion 3 is not connected to the body portion 2. This structure will be described. FIG. 3 is a diagram illustrating an example of a state in which the grip portion is detached from the body portion of the radio tag reading device according to the embodiment.

When the grip portion 3 is detached from the body portion 2, the distance between the magnetic sensor 6 and the magnet 7 is further greater than the distance between the magnetic sensor 6 and the magnet 7 when the body portion 2 is connected to the grip portion 3 and the state of the grip portion 3 illustrated in FIG. 2 is the state in which the distance between the magnet 7 and the magnetic sensor 6 is distant.

Accordingly, the magnetic flux density is further lower than in the state in which the distance between the magnet 7 and the magnetic sensor 6 is distant. That is, when a change in the magnetic flux density is detected, it can be detected that the grip portion 3 is detached from the body portion 2.

Figure 4:
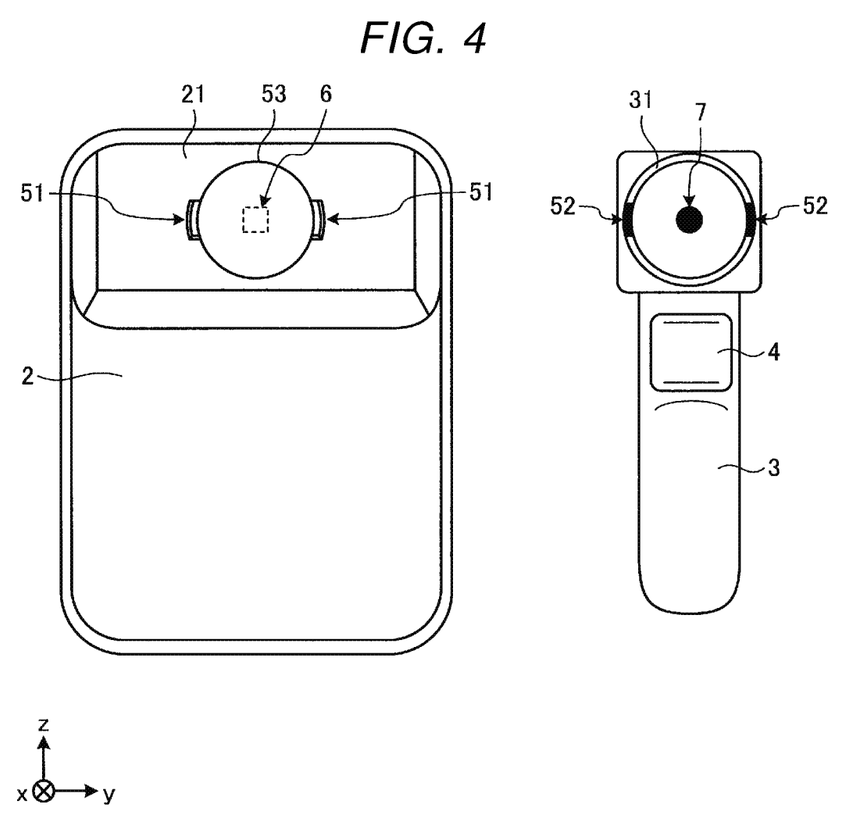
FIG. 4 is a diagram illustrating an example of a structure of the vicinity of a joining portion of the radio tag reading device.

Next, the structure of the vicinity of the joining portion 5 will be described. FIG. 4 is a diagram illustrating an example of the structure of the vicinity of the joining portion of the radio tag reading device according to the embodiment. The left side of FIG. 4 is a diagram when the body portion 2 is viewed from the rear surface side of the body portion 2. The right side of FIG. 4 is a diagram when the grip portion is viewed from the front surface side. In the embodiment, the rear surface of the body portion 2 is a surface to which the grip portion 3 is connected. The front surface of the grip portion 3 is a surface facing the body portion 2 when he grip portion 3 is connected to the body portion 2.

The substantially rectangular body portion 2 includes the protrusion 21 that protrudes on the rear surface side. The protrusion 21 is provided on the upper side of a central line of the body portion 2 in the transverse direction. A groove 53 formed in a curve shape drawn as a substantial circle is formed in the protrusion 21. In the groove 53, a central point of the substantial circle drawn by the groove 53 is located on a central line of the body portion 2 in the longitudinal direction.

The protrusion 21 includes one pair of lock mechanisms (grooves) 51 and the magnetic sensor 6. The lock mechanisms (grooves) 51 will be described later. The magnetic sensor 6 is provided inside the protrusion 21 and is located in a substantial center of the substantial circle drawn by the groove 53.

The grip portion 3 includes a substantially circular projection 31 in the upper part. A pool of the projection 31 inscribes in the groove 53 when the body portion 2 is connected to the grip portion 3. The projection 31 includes one pair of lock mechanisms (claws) 52. The lock mechanisms (claws) 52 will be described later. In the grip portion 3, the trigger switch 4 is embedded in a movable state.

The magnet 7 is provided in the other end of a pressing portion of the trigger switch 4. When the trigger switch 4 enters a pressing state, the magnet 7 is located in a substantial center of the substantially circular projection 31.

The lock mechanisms (grooves) 51 and the lock mechanisms (claws) 52 will be described. In the embodiment, the lock mechanisms (grooves) 51 are paired and are on the circumference of the substantial circle drawn by the groove 53 and face each other with the magnetic sensor 6 interposed therebetween. There are spaces inside the lock mechanisms (grooves) 51. The lock mechanisms (claws) 52 are paired and face each other with the magnet 7 interposed therebetween when the trigger switch 4 enters a pressing state.

The lock mechanisms (claws) 52 are formed of an elastically deformed material and have returns in their tips. The lock mechanisms (claws) 52 may not be fitted in the lock mechanisms (grooves) 51 in a state as they are. However, when the user picks up the lock mechanisms (claws) 52 from both sides with two fingers and applies force to the pair of lock mechanisms (claws) 52, the lock mechanisms (claws) 52 can be elastically deformed to be fitted in the lock mechanisms (grooves) 51 on the side of the body portion 2.

When the user detaches their fingers fitting the lock mechanisms (claws) 52 after inserting the lock mechanisms (claws) 52 into the lock mechanisms (grooves) 51, and the applied force is released, the lock mechanisms (claws) 52 are returned to the original shape. Here, the returns of the lock mechanisms (claws) 52 claw in the spaces inside the lock mechanisms (grooves) 51.

Then, even when the grip portion 3 is pulled, the returns are caught in the pool of the lock mechanisms (grooves) 51, and thus the lock mechanisms (claws) 52 cannot pass the lock mechanisms (grooves) 51. As long as the lock mechanisms (claws) 52 are not elastically deformed by applying a force again, the lock mechanisms (claws) 52 do not move out of the lock mechanisms (grooves) 51. That is, in the radio tag reading device 1, the grip portion 3 can be connected to the body portion 2 in a hardly movable state by the lock mechanisms (grooves) 51 and the lock mechanisms (claws) 52.

The body portion 2 can be connected to the grip portion 3 in a forward direction in which the tip of the grip portion 3 faces a bottom surface side of the body portion 2 and an opposite direction in which the tip of the grip portion 3 faces the opposite side to the forward direction. In the embodiment, the bottom surface of the body portion 2 is a surface contiguous to the rear surface, is a surface substantially parallel to the central line of the body portion 2 in the transverse direction, and is a surface contiguous to the rear surface of the body portion 2 on the side on which the projection 21 is not located.

Figure 5:
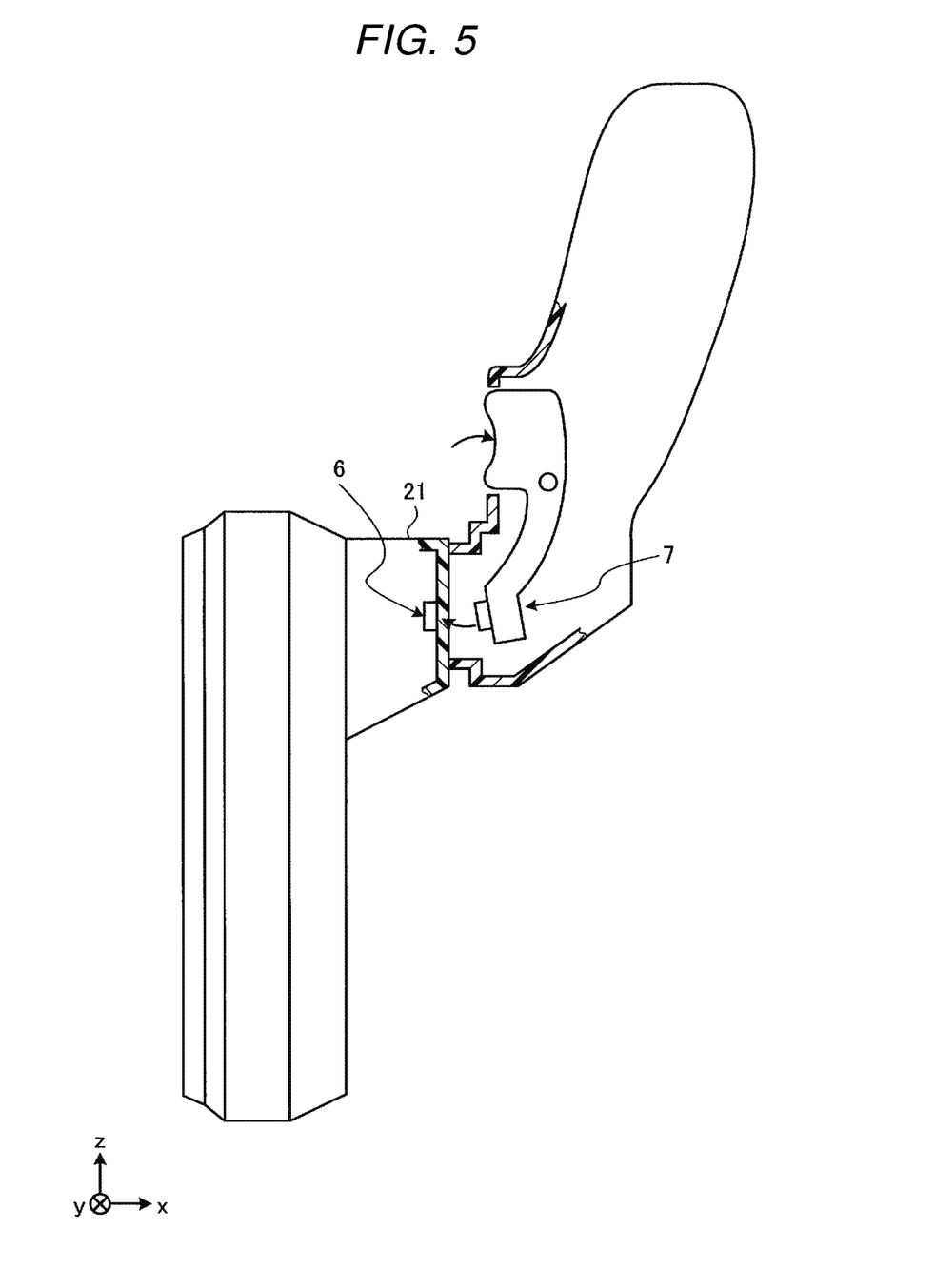
FIG. 5 is a perspective view illustrating an example of a state in which the grip portion of the radio tag reading device is connected to the body portion in an opposite direction.

FIG. 5 is a perspective view illustrating an example of a state in which the grip portion of the radio tag reading device is connected to the body portion in the opposite direction according to the embodiment. In the radio tag reading device 1 according to the embodiment, even when the body portion 2 is connected to the grip portion 3 in the opposite direction, it can be detected whether the state of the grip portion 3 is the connection state or the non-connection state, as in the case in which the body portion 2 is connected to the grip portion 3 in the forward direction. When the state of the grip portion 3 is the connection state, it can be detected whether the state of the grip portion 3 is a state in which the distance between the magnet 7 and the magnetic sensor 6 is close or a state in which the distance between the magnet 7 and the magnetic sensor 6 is distant.

This is because in the structure in which the magnetic sensor 6 is located in the substantial center of the substantial circle drawn by the groove 53 and the magnet 7 is located at the substantial center of the projection 31 when the trigger switch 4 is pressed, a positional relation between the magnetic sensor 6 and the magnet 7 is not substantially changed between the connection in the forward direction and the connection in the opposite direction. The attachment direction of the foregoing grip portion 3 is exemplary and the body portion 2 may be connected to the grip portion 3 in any direction.

Hardware Configuration of Radio Tag Reading Device

Figure 6:
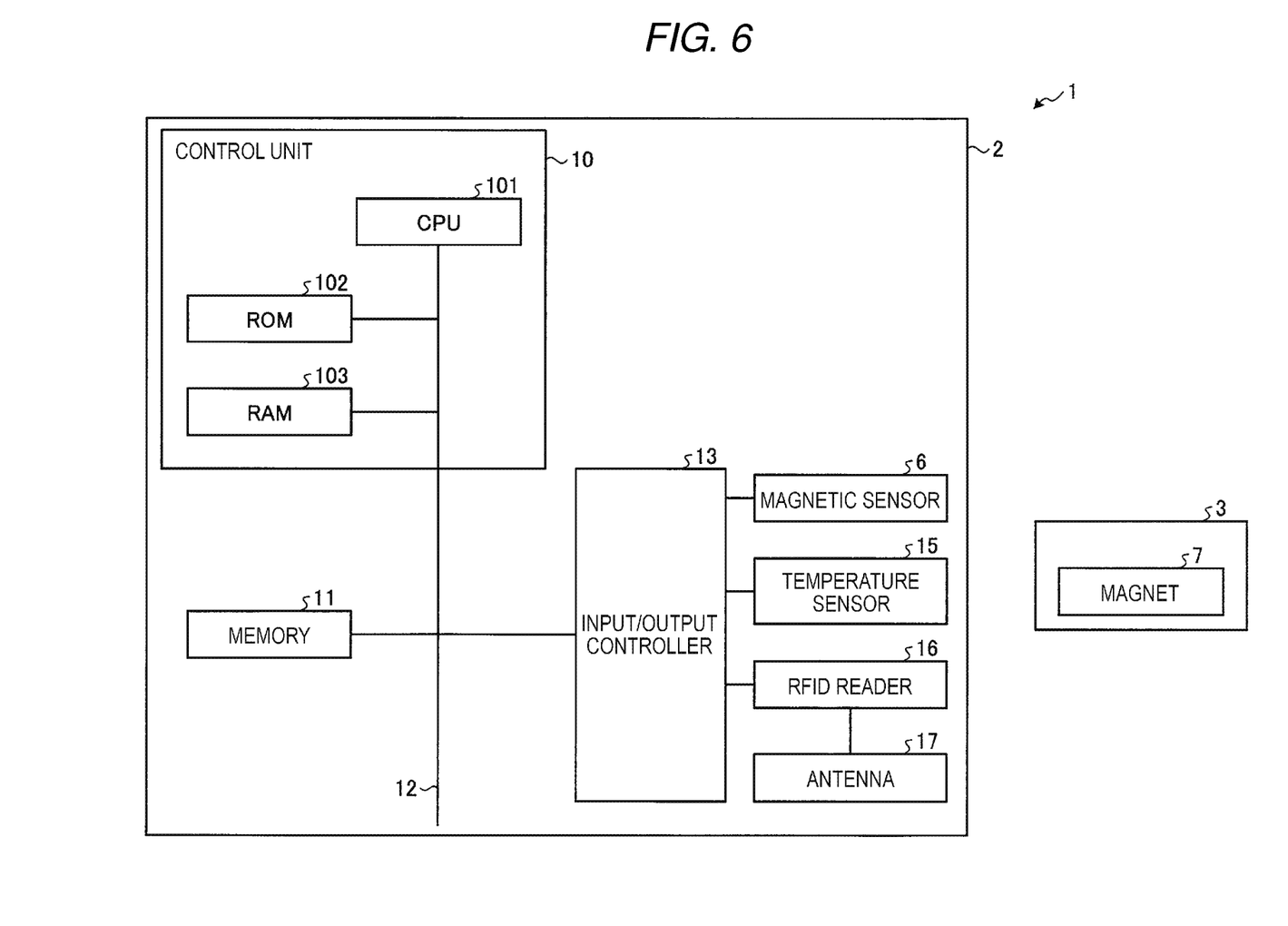
FIG. 6 is a block diagram illustrating an example of a hardware configuration of the radio tag reading device.

Next, a hardware configuration of the radio tag reading device 1 according to the embodiment will be described. FIG. 6 is a block diagram illustrating an example of a hardware configuration of the radio tag reading device according to the embodiment.

In the radio tag reading device 1, the body portion 2 includes a control unit 10, a memory 11, and an input/output controller 13. The grip portion 3 includes the magnet 7. The magnet 7 of the grip portion 3 will not be described since the magnet 7 is described above.

First, the control unit 10 will be described. The control unit 10 includes a central processing unit (CPU) 101, a read-only memory (ROM) 102, a random access memory (RAM) 103. The CPU 101 is connected to the ROM 102 and the RAM 103 via a bus line 12.

The CPU 101 loads various programs stored in the ROM 102 or the memory 11 on the RAM 103. The CPU 101 operates according to the various programs loaded on the RAM 103 to control the radio tag reading device 1. That is, the control unit 10 has a general computer configuration.

The control unit 10 is connected to the memory 11 and the input/output controller 13 via the bus line 12.

The memory 11 is a hard disk drive (HDD) or a non-volatile memory such as a flash memory in which stored information is kept even when power is turned off. The memory 11 stores programs and the like including a control program. The control program is a program that has implements the functions of the radio tag reading device 1.

The input/output controller 13 is connected to the magnetic sensor 6 and a temperature sensor 15. The input/output controller 13 is connected to an RFID reader 16 and an antenna 17. The input/output controller 13 controls various kinds of connected hardware in response to instructions from the control unit 10.

The magnetic sensor 6 will not be described in detail since the magnetic sensor 6 is described above. The temperature sensor 15 detects a temperature of the body portion 2. The temperature sensor 15 is, for example, a sensor that can detect a temperature of a thermistor or the like. The temperature sensor 15 is an example of a "temperature detection unit".

The RFID reader 16 radiates a radio wave from the antenna 17 by operating the antenna 17. The RFID reader 16 acquires tag information from an RFID tag received by the antenna 17 and outputs the tag information to, for example, a host device such as a POS terminal. That is, the RFID reader 16 can be rephrased as a unit that reads information stored in an RFID tag. In the embodiment, the RFID reader 16 reads information stored in an RFID tag.

Function of Radio Tag Reading Device

Figure 7:
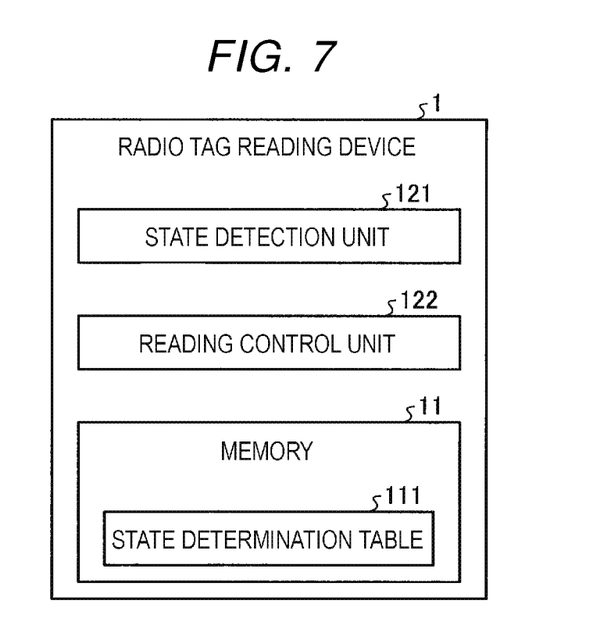
FIG. 7 is a block diagram illustrating an example of a functional configuration of the radio tag reading device.

Next, a functional configuration of the radio tag reading device 1 according to the embodiment will be described. FIG. 7 is a block diagram illustrating an example of a functional configuration of the radio tag reading device according to the embodiment.

The radio tag reading device 1 includes a state detection unit 121 and a reading control unit 122. The state detection unit 121 detects a state of the grip portion 3 based on magnetism detected by the magnetic sensor 6 when the body portion 2 is connected to the grip portion 3.

Based on the magnetism detected by the magnetic sensor 6, the state detection unit 121 detects that the state of the grip portion 3 is the connection state in which the grip portion 3 is connected to the body portion 2 or the non-connection state in which the grip portion 3 is not connected to the body portion 2. In the embodiment, the state detection unit 121 detects the state of the grip portion 3 based on the magnetism detected as the magnetic flux density by the magnetic sensor 6 and a state determination table 111 to be described below.

Specifically, when the magnetic flux density is less than a first threshold, the state detection unit 121 detects that the state of the grip portion 3 is in the non-connection state with reference to the state determination table 111 of the memory 11. When the magnetic flux density is equal to or greater than the first threshold and equal to or less than a second threshold, the state detection unit 121 detects that the state of the grip portion 3 is a state in which the distance between the magnet 7 and the magnetic sensor 6 is distant. When the magnetic flux density is greater than the second threshold, the state detection unit 121 detects that the state of the grip portion 3 is a state in which the distance between the magnet 7 and the magnetic sensor 6 is close.

The reading control unit 122 controls the RFID reader 16 according to the state of the grip portion 3 detected by the state detection unit 121. In the embodiment, when the state of the grip portion 3 detected by the state detection unit 121 is the state in which the distance between the magnet 7 and the magnetic sensor 6 is close, the reading control unit 122 radiates a radio wave from the antenna 17 and enables the RFID reader 16 to read the RFID tag.

In the embodiment, when the state of the grip portion 3 detected by the state detection unit 121 is the state in which the distance between the magnet 7 and the magnetic sensor 6 is distant, the reading control unit 122 stops the radiation of the radio wave from the antenna 17 and disables the RFID reader 16 to read the RFID tag.

Conversely, when the state of the grip portion 3 detected by the state detection unit 121 is the state in which the distance between the magnet 7 and the magnetic sensor 6 is close, the reading control unit 122 may stop the radiation of the radio wave from the antenna 17 and disable the RFID reader 16 to read the RFID tag. When the state of the grip portion 3 detected by the state detection unit 121 is the state in which the distance between the magnet 7 and the magnetic sensor 6 is distant, the reading control unit 122 may radiate a radio wave from the antenna 17 and enable the RFID reader 16 to read the RFID tag.

In the embodiment, when the state of the grip portion 3 detected by the state detection unit 121 is the non-connection state, the reading control unit 122 allows a radio wave to be regularly radiated from the antenna 17 and regularly enables the RFID reader 16 to read the RFID tag.

In the embodiment, based on a temperature detected by the temperature sensor 15, the reading control unit 122 controls an operation of the RFID reader 16 and changes a control method for an operation of the RFID reader 16 between the case in which the state of the grip portion 3 is the connection state and the case in which the state of the grip portion 3 is the non-connection state.

Specifically, when the temperature of the body portion 2 detected by the temperature sensor 15 is greater than a threshold, the reading control unit 122 performs control by lowering a transmission output of the RFID 16, shortening a reading time, or providing a pause time. The reading control unit 122 performs the control by changing the threshold of the temperature between the connection state in which the body portion 2 is connected to the grip portion 3 and the non-connection state in which the body portion 2 is not connected to the grip portion 3.

The threshold of the temperature is changed according to the connection state in which the body portion 2 is connected to the grip portion 3 and the non-connection state in which the body portion 2 is not connected to the grip portion 3 because the temperature is not rather problematic despite an increase in the temperature since the user is considered to grip the grip portion 3 in the connection state in which the body portion 2 is connected to the grip portion 3, but it is necessary to prevent a low temperature burn of the user since there is a possibility of the user gripping the body portion 2 in the non-connection state in which the body portion 2 is not connected to the grip portion 3.

Figure 8:
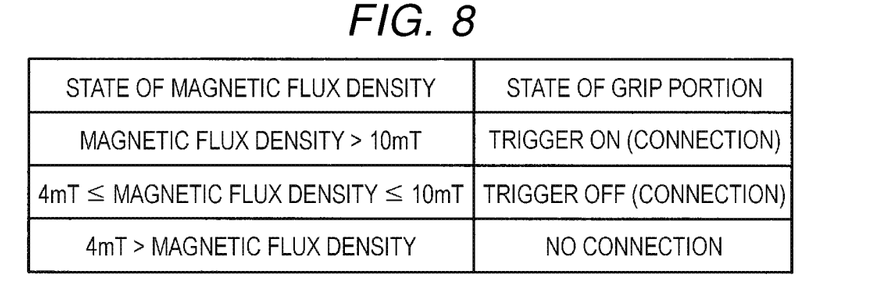
FIG. 8 is a diagram illustrating an example of a state determination table of the radio tag reading device.

Next, information stored in the memory 11 of the radio tag reading device 1 will be described. In the embodiment, the memory 11 stores the state determination table 111. The state determination table 111 according to the embodiment is a table in which states of a magnetic flux density detected by the magnetic sensor 6 are associated with the states of the grip portion 3 of the radio tag reading device 1. The state determination table 111 is used to detect the state of the grip portion 3 by the state detection unit 121.

FIG. 8 is a diagram illustrating an example of a state determination table of the radio tag reading device 1 according to the embodiment. In the example, for example, when a magnetic flux density detected by the magnetic sensor 6 is 3 mT, the state detection unit 121 detects that the state of the grip portion 3 is the non-connection state in which the grip portion 3 is not connected to the body portion 2.

For example, when a magnetic flux density detected by the magnetic sensor 6 is 7 mT, the state detection unit 121 detects that the state of the grip portion 3 is the connection state in which the grip portion 3 is connected to the body portion 2 and detects that the state of the trigger switch 4 is a state in which the distance between the magnet 7 and the magnetic sensor 6 is distant.

For example, when a magnetic flux density detected by the magnetic sensor 6 is 11 mT, the state detection unit 121 detects that the state of the grip portion 3 is the connection state in which the grip portion 3 is connected to the body portion 2 and detects that the state of the trigger switch 4 is a state in which the distance between the magnet 7 and the magnetic sensor 6 is close. A location in which the state determination table 111 is stored is not limited to the memory 11. For example, the location in which the state determination table 111 may be a memory of an external device such as a server.

Advantages of Radio Tag Reading Device

Next, advantages of the radio tag reading device 1 according to the embodiment will be described. The radio tag reading device 1 according to the embodiment includes the grip portion 3 detachably mounted on the body portion 2. The user merely picks up the lock mechanisms (claws) 52 provided in the grip portion 3 to insert the lock mechanism (claws) 52 into the lock mechanisms (grooves) 51 provided in the protrusion 21 of the body portion 2, and thus the body portion 2 can be connected to the grip portion 3.

That is, the radio tag reading device 1 according to the embodiment, the body portion 2 can be detachably mounted on the grip portion 3 in a simple order. Thus, when the radio tag reading device 1 according to the embodiment is used in a stationary state, the grip portion 3 is not interrupted and the radio tag reading device 1 can be stably installed. Even when the radio tag reading device 1 according to the embodiment is inserted into to be used in a narrow place, the grip portion 3 is not interrupted.

Incidentally, when the grip portion can be detachably mounted and the grip portion includes the trigger switch used to perform an operation of reading a radio tag, there is concern of the body portion not being able to detect a state of the trigger switch.

On the other hand, in the radio tag reading device 1 according to the embodiment, the body portion 2 includes the magnetic sensor 6 and the grip portion 3 includes the magnet 7. Thus, the magnet 7 moves in conjunction with an operation on the trigger switch 4 and the distance between the magnetic sensor 6 and the magnet 7 is changes according to an operation on the trigger switch 4.

The radio tag reading device 1 includes the state detection unit 121 detecting that the state of the grip portion 3 is the state in which the distance between the magnet 7 and the magnetic sensor 6 is close or the state in which the distance between the magnet 7 and the magnetic sensor 6 is distant based on the magnetism detected by the magnetic sensor 6.

Therefore, in the radio tag reading device 1 according to the embodiment, even when the grip portion 3 can be detached, the body portion 2 can detect that the state of the grip portion 3 is the state in which the distance between the magnet 7 and the magnetic sensor 6 is close or the state in which the distance between the magnet 7 and the magnetic sensor 6 is distant.

Based on the detection result of the magnetic sensor 6, the state detection unit 121 can also detect whether the state of the grip portion 3 is the connection state in which the body portion 2 is connected to the grip portion 3 or the non-connection state in which the body portion 2 is not connected to the grip portion 3.

Specifically, when the magnetic flux density is less than the first threshold, the state detection unit 121 detects that the state of the grip portion 3 is the non-connection state with reference to the state determination table 111. When the magnetic flux density is equal to or greater than the first threshold and equal to or less than a second threshold, the state detection unit 121 detects that the state of the grip portion 3 is the state in which the distance between the magnet 7 and the magnetic sensor 6 is distant. When the magnetic flux density is greater than the second threshold, the state detection unit 121 detects that the state of the grip portion 3 is the state in which the distance between the magnet 7 and the magnetic sensor 6 is close.

Accordingly, from the detection result of the magnetic sensor 6, the state detection unit 121 can detect whether the body portion 2 is connected to the grip portion 3. When the body portion 2 is connected to the grip portion 3, the state detection unit 121 can detect whether the distance between the magnet 7 and the magnetic sensor 6 is close or the distance between the magnet 7 and the magnetic sensor 6 is distant.

That is, in the radio tag reading device 1 according to the embodiment, the state of the grip portion 3 (the connection state or the non-connection state and the state in which the distance between the magnet 7 and the magnetic sensor 6 is close or the state in which the distance between the magnet 7 and the magnet sensor 6 is distant) can be detected by combining one magnetic sensor 6 and one magnet.

The radio tag reading device 1 according to the embodiment includes the temperature sensor 15 that detects the temperature of the body portion 2 and the reading control unit 122 that controls an operation of the RFID reader 16 based on a detection result of the temperature sensor 15. Thus, when the temperature is greater than a threshold, the radio tag reading device 1 can lower a transmission output of the RFID reader 16, shortens a reading time, or provides a pause time to inhibit an increase in temperature.

Incidentally, when the grip portion 3 is detached, the user can be considered to use the wireless tag reading device 1 holding the body portion 2. When the grip portion 3 is connected, the user is considered to use the radio tag reading device 1 holding the grip portion 3. Therefore, even when the temperature of the body portion 2 increases a little, there is no large problem. However, when the user uses the radio tag reading device 1 holding the body portion 2, there is concern of the user suffering from a low temperature burn even when the temperature increases a little.

Thus, the reading control unit 122 changes control by lowering a transmission output of the RFID reader 16, shortening a reading time, or providing a pause time between the case in which the body portion 2 is connected to the grip portion 3 and the case in which the body portion 2 is not connected to the grip portion 3. Specifically, a threshold of the temperature at which the control starts is changed between the case of the connection and the case of the non-connection.

Thus, in the radio tag reading device 1 according to the embodiment, when the body portion 2 is not connected to the grip portion 3, it is possible to reduce a possibility of the user suffering from a low temperature burn by lowering a transmission output of the RFID reader 16, shortening a reading time, or providing a pause time or by performing the control earlier.

In the radio tag reading device 1 according to the embodiment, it is possible to connect the body portion 2 to the grip portion 3 in the forward direction in which the tip of the grip portion 3 faces the bottom surface side of the body portion 2 and it is also possible to connect the body portion 2 to the grip portion 3 in the opposite direction in which the tip of the grip portion 3 faces the opposite side to the forward direction.

The radio tag reading device 1 according to the embodiment has the structure in which the magnetic sensor 6 is located in the substantial center of the substantial circle drawn by the groove 53 provided in the body portion 2 and the magnet 7 is located at the substantial center of the projection 31 provided in the grip portion 3 when the trigger switch 4 is pressed. Since a positional relation between the magnetic sensor 6 and the magnet 7 is not substantially changed between the connection in the forward direction and the connection in the opposite direction, it is not necessary to provide a magnetic sensor and a magnet for the case of the connection in the opposite direction.

MODIFICATION EXAMPLES

In the foregoing embodiment, the body portion 2 is connected to the grip portion 3 in both the forward direction in which the tip of the grip portion 3 faces the bottom surface side of the body portion 2 and the opposite direction in which the tip of the grip portion 3 faces the opposite side to the forward direction. However, the radio tag reading device 1 may be configured to detect a connection direction. Hereinafter, a configuration of the radio tag reading device 1 capable of detecting connection direction will be described.

Figure 9:
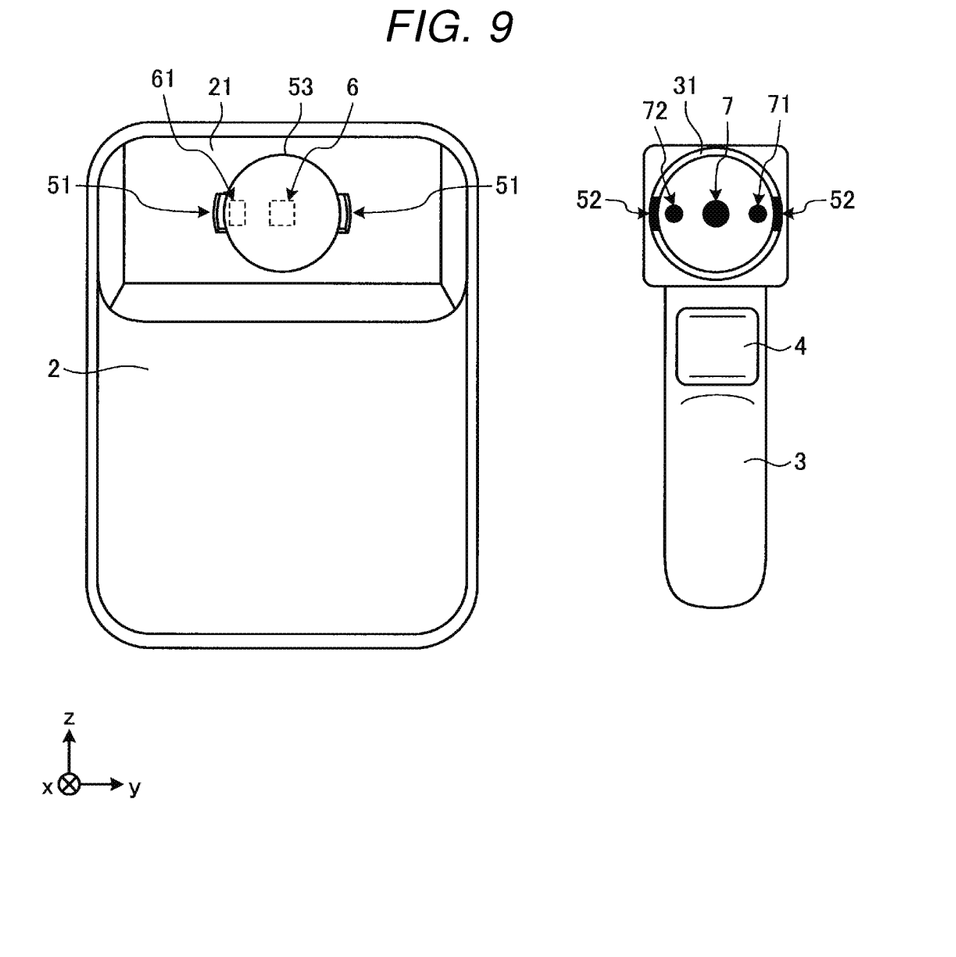
FIG. 9 is a diagram illustrating an example of a structure of a joining portion of a radio tag reading device according to a modification example.

FIG. 9 is a diagram illustrating an example of a structure of a joining portion of a radio tag reading device according to a modification example. The radio tag reading device 1 according to the modification example includes a connection direction detection magnetic sensor 61 inside the joining portion 5 of the body portion 2 in addition to the configuration of the forgoing embodiment. The projection 31 of the grip portion 3 includes a forward direction detection magnet 71 and an opposite direction detection magnet 72.

According to the embodiment, the connection direction detection magnetic sensor 61 detects a magnetic flux density from the forward direction detection magnet 71 or the opposite direction detection magnet 72. The forward direction detection magnet 71 is a magnet detecting that the body portion 2 is connected to the grip portion 3 in the forward direction. The opposite direction detection magnet 72 is a magnet detecting that the body portion 2 is connected to the grip portion 3 in the opposite direction.

When the body portion 2 is connected to the grip portion 3 in the forward direction, the magnetism of the forward direction detection magnet 71 has an influence on the magnetic flux density detected by the connection direction detection magnetic sensor 61. When the body portion 2 is connected to the grip portion 3 in the opposite direction, the magnetism of the opposite direction detection magnet 72 has an influence on the magnetic flux density detected by the connection direction detection magnetic sensor 61.

Accordingly, when a difference between the magnetism of the forward direction detection magnet 71 and the magnetism of the opposite direction detection magnet 72 is provided, a difference occurs in the magnetic flux density detected by the connection direction detection magnetic sensor 61 in the connection state of the body portion 2 and the grip portion 3. That is, when the connection direction detection magnetic sensor 61 detects the magnetic flux density, it is possible to detect whether the body portion 2 is connected to the grip portion 3 in the forward direction or the opposite direction.

Figure 10:
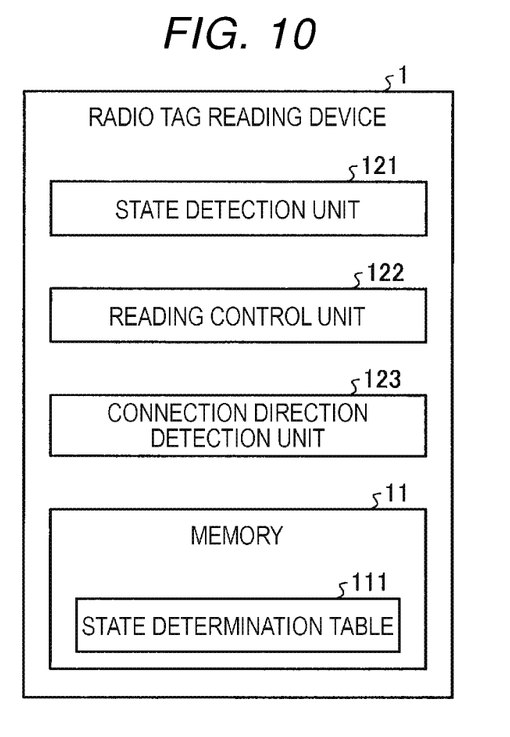
FIG. 10 is a block diagram illustrating an example of a functional configuration of the radio tag reading device.

FIG. 10 is a block diagram illustrating an example of a functional configuration of the radio tag reading device according to the modification example. The radio tag reading device 1 according to the modification example includes a connection direction detection unit 123 in addition to the configuration of the foregoing embodiment. Based on a detection result of the connection direction detection magnetic sensor 61, the connection direction detection unit 123 detects whether the body portion 2 is connected to the grip portion 3 in the forward direction or the opposite direction.

Specifically, for example, when the magnetism of the forward direction detection magnet 71 is stronger than the magnetism of the opposite direction detection magnet 72, the state detection unit 121 detects that the body portion 2 is connected to the grip portion 3, and the connection direction detection magnetic sensor 61 detects a magnetism flux density equal to or greater than a threshold, the connection direction detection unit 123 detects that the body portion 2 is connected to the grip portion 3 in the forward direction. When the connection direction detection magnetic sensor 61 detects the magnetic flux density less than the threshold, the connection direction detection unit 123 detects that the body portion 2 is connected to the grip portion 3 in the opposite direction.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

For example, a program executed in the radio tag reading device 1 according to the foregoing embodiment is embedded in advance in a storage medium (the ROM 102 or the memory 11) included in the radio tag reading device 1 to be provided, but an exemplary embodiment is not limited thereto. The program may be as a file of an installable format or an executable format and recorded on a computer-readable recording medium such as a CD-ROM, a flexible disc (FD), a CD-R, or a digital versatile disk (DVD) to be provided.

The storage medium is not limited to a medium independent from a computer or an embedded system and includes a storage medium in which a program delivered via LAN, the Internet, or the like is downloaded and stored or temporarily stored.

The program executed in the radio tag reading device 1 according to the foregoing embodiments may be stored on a computer connected to a network such as the Internet and may be downloaded via the network to be provided. The program executed in the radio tag reading device 1 according to the foregoing embodiments may be provided or distributed via a network such as the Internet.

What is claimed is:

1. A radio tag reading device comprising:
a body portion including a radio tag reader that reads a radio tag;
a grip portion detachably connected to the body portion;
a magnet provided in the grip portion; and
a magnet detector provided in the body portion and configured to detect magnetism generated by the magnet; and
a memory that stores a state determination table in which states of a magnetic flux density detected by the magnetic detector are associated with states of the grip portion.

2. The device according to claim 1, further comprising:
an operation component provided in the grip portion and configured to operate reading of the radio tag;
a state detector configured to detect a state of the grip portion based on the magnetism detected by the magnet detector; and
a reading controller configured to control the radio tag reading unit, wherein
the magnet moves in conjunction with an operation of the operation component and a distance between the magnet and the magnetic detector changes according to the operation of the operation unit, and
the reading controller controls the radio tag reader according to the state of the grip portion detected by the state detector.

3. The device according to claim 2, wherein
the reading controller radiates a radio wave and allows the radio tag reader to read the radio tag when the state of the grip portion detected by the state detector is a state in which a distance between the magnet and the magnetic detector is smaller than a first distance threshold, and
the reading control unit stops the radiation of the radio wave and allow the radio tag reader not to be able to read the radio tag when the state of the grip portion is a state in which the distance between the magnet and the magnetic detector is larger than a second distance threshold.

4. The device according to claim 2, wherein, based on the magnetism detected by the magnetic detector, the state detector detects whether the state of the grip portion is a connection state in which the grip portion is connected to the body portion or a non-connection state in which the grip portion is not connected to the body portion.

5. The device according to claim 4, wherein
the body portion further includes a temperature detector configured to detect a temperature of the body portion, and the reading controller controls an operation of the radio tag reader based on a temperature detected by the temperature detector and changes a control method for the operation of the radio tag reader between a case in which the state of the grip portion is the connection state and a case in which the state of the grip portion is the non-connection state.

6. The device according to claim 4, wherein
the magnetic detector detects magnetism as a magnetic flux density,
the state detector detects that the state of the grip portion is the non-connection state when the magnetic flux density is less than a first threshold,
the state detector detects that the state of the grip portion is a state in which the distance between the magnet and the magnetic detector is distant when the magnetic flux density is equal to or greater than the first threshold and equal to or less than a second threshold, and
the state detector detects that the state of the grip portion is a state in which the distance between the magnet and the magnetic detector is close when the magnetic flux density is greater than the second threshold.

7. The device according to claim 1, further comprising: a joining portion that joins the body portion with the grip portion when the body portion is connected to the grip portion.

8. The device according to claim 1, further comprising: a display that displays information.

9. The device according to claim 1, further comprising: a trigger switch that changes a state of the grip portion to a state in which a distance between the magnet and the magnetic detector is lower than a first distance threshold or a state in which the distance between the magnet and the magnetic detector is larger than a second distance threshold when the body portion is connected to the grip portion.

10. A hand-held radio tag reading device comprising:
a body portion including a radio tag reader that reads a radio tag;
a grip portion detachably connected to the body portion;
a magnet provided in the grip portion;
a magnet detector provided in the body portion and configured to detect magnetism generated by the magnet; and
a memory that stores a state determination table in which states of a magnetic flux density detected by the magnetic detector are associated with states of the grip portion.

11. The hand-held device according to claim 10, further comprising:
an operation component provided in the grip portion and configured to operate reading of the radio tag;
a state detector configured to detect a state of the grip portion based on the magnetism detected by the magnet detector; and
a reading controller configured to control the radio tag reading unit, wherein
the magnet moves in conjunction with an operation of the operation component and a distance between the magnet and the magnetic detector changes according to the operation of the operation unit, and
the reading controller controls the radio tag reader according to the state of the grip portion detected by the state detector.

12. The hand-held device according to claim 11, wherein
the reading controller radiates a radio wave and allows the radio tag reader to read the radio tag when the state of the grip portion detected by the state detector is a state in which a distance between the magnet and the magnetic detector is smaller than a first distance threshold, and
the reading control unit stops the radiation of the radio wave and allow the radio tag reader not to be able to read the radio tag when the state of the grip portion is a state in which the distance between the magnet and the magnetic detector is larger than a second distance threshold.

13. The hand-held device according to claim 11, wherein, based on the magnetism detected by the magnetic detector, the state detector detects whether the state of the grip portion is a connection state in which the grip portion is connected to the body portion or a non-connection state in which the grip portion is not connected to the body portion.

14. The hand-held device according to claim 13, wherein
the body portion further includes a temperature detector configured to detect a temperature of the body portion, and
the reading controller controls an operation of the radio tag reader based on a temperature detected by the temperature detector and changes a control method for the operation of the radio tag reader between a case in which the state of the grip portion is the connection state and a case in which the state of the grip portion is the non-connection state.

15. The hand-held device according to claim 13, wherein
the magnetic detector detects magnetism as a magnetic flux density,
the state detector detects that the state of the grip portion is the non-connection state when the magnetic flux density is less than a first threshold,
the state detector detects that the state of the grip portion is a state in which the distance between the magnet and the magnetic detector is distant when the magnetic flux density is equal to or greater than the first threshold and equal to or less than a second threshold, and
the state detector detects that the state of the grip portion is a state in which the distance between the magnet and the magnetic detector is close when the magnetic flux density is greater than the second threshold.

16. The hand-held device according to claim 10, further comprising:
a joining portion that joins the body portion with the grip portion when the body portion is connected to the grip portion.

17. The hand-held device according to claim 10, further comprising:
a display that displays information.

18. The hand-held device according to claim 10, further comprising:
a trigger switch that changes a state of the grip portion to a state in which a distance between the magnet and the magnetic detector is lower than a first distance threshold or a state in which the distance between the magnet and the magnetic detector is larger than a second distance threshold when the body portion is connected to the grip portion.

19. A radio tag reading device comprising:
a body portion including a radio tag reader that reads a radio tag;
a grip portion detachably connected to the body portion;
a magnet provided in the grip portion;
a magnet detector provided in the body portion and configured to detect magnetism generated by the magnet;

an operation component provided in the grip portion and configured to operate reading of the radio tag;

a state detector configured to detect a state of the grip portion based on the magnetism detected by the magnet detector; and a reading controller configured to control the radio tag reading unit, wherein the magnet moves in conjunction with an operation of the operation component and a distance between the magnet and the magnetic detector changes according to the operation of the operation unit, the reading controller controls the radio tag reader according to the state of the grip portion detected by the state detector, based on the magnetism detected by the magnetic detector, the state detector detects whether the state of the grip portion is a connection state in which the grip portion is connected to the body portion or a non-connection state in which the grip portion is not connected to the body portion, the body portion further includes a temperature detector configured to detect a temperature of the body portion, and the reading controller controls an operation of the radio tag reader based on a temperature detected by the temperature detector and changes a control method for the operation of the radio tag reader between a case in which the state of the grip portion is the connection state and a case in which the state of the grip portion is the non-connection state.

20. The device according to claim 19, wherein the reading controller radiates a radio wave and allows the radio tag reader to read the radio tag when the state of the grip portion detected by the state detector is a state in which a distance between the magnet and the magnetic detector is smaller than a first distance threshold, and the reading control unit stops the radiation of the radio wave and allow the radio tag reader not to be able to read the radio tag when the state of the grip portion is a state in which the distance between the magnet and the magnetic detector is larger than a second distance threshold.

* * * * *